United States Patent
Durand de Gevigney

(10) Patent No.: US 11,965,834 B2
(45) Date of Patent: Apr. 23, 2024

(54) DARK-FIELD OPTICAL INSPECTION DEVICE

(71) Applicant: Unity Semiconductor, Montbonnot-Saint-Martin (FR)

(72) Inventor: Mayeul Durand de Gevigney, Meylan (FR)

(73) Assignee: Unity Semiconductor, Montbonnot-Saint-Martin (FR)

(*) Notice: Subject to any disclaimer, the term of this patent is extended or adjusted under 35 U.S.C. 154(b) by 250 days.

(21) Appl. No.: 17/283,686

(22) PCT Filed: Sep. 20, 2019

(86) PCT No.: PCT/FR2019/052210
§ 371 (c)(1),
(2) Date: Apr. 8, 2021

(87) PCT Pub. No.: WO2020/074800
PCT Pub. Date: Apr. 16, 2020

(65) Prior Publication Data
US 2021/0349037 A1    Nov. 11, 2021

(30) Foreign Application Priority Data
Oct. 8, 2018 (FR) ...................... 1859311

(51) Int. Cl.
*G01N 21/88* (2006.01)
*G01N 21/47* (2006.01)
*G01N 21/95* (2006.01)

(52) U.S. Cl.
CPC ....... *G01N 21/8806* (2013.01); *G01N 21/474* (2013.01); *G01N 21/9501* (2013.01);
(Continued)

(58) Field of Classification Search
CPC ... G01N 2021/4704; G01N 2021/4707; G01N 2021/4709; G01N 2021/4742;
(Continued)

(56) References Cited

U.S. PATENT DOCUMENTS 6,538,730 B2    3/2003  Vaez-Iravani et al.
7,001,055 B1 *  2/2006  Lange ................ G02B 27/0994
                                                          359/368

(Continued)

FOREIGN PATENT DOCUMENTS

DE    2637375       6/1978
EP    2685237 A1   1/2014
(Continued)

OTHER PUBLICATIONS

International Search Report for International Application No. PCT/FR2019/052210 dated Jan. 24, 2020, 3 pages.
(Continued)

*Primary Examiner* — Tri T Ton
(74) *Attorney, Agent, or Firm* — TraskBritt

(57) ABSTRACT

A device for dark-field optical inspection of a substrate comprises: a light source for generating an incident beam that is projected onto an inspection zone of the substrate and that is capable of being reflected in the form of diffuse radiation; at least one first and one second collecting device; and a reflecting device for directing at least a portion of the diffuse radiation originating from a focal point of collection coincident with the inspection zone in the direction of the collecting devices, with a first and second reflective zone from which a first portion of the diffuse radiation is directed toward a first focal point, which is optically conjugated with the focal point of collection, and a second portion of the diffuse radiation is reflected toward a second focal point, (Continued)

which is optically conjugated with the collection focal point and distinct from the first focal point of detection.

18 Claims, 4 Drawing Sheets

(52) U.S. Cl.
CPC . *G01N 21/9506* (2013.01); *G01N 2021/4707* (2013.01); *G01N 2021/4709* (2013.01); *G01N 2021/4742* (2013.01); *G01N 2021/8822* (2013.01)

(58) Field of Classification Search
CPC ......... G01N 2021/8822; G01N 21/474; G01N 21/8806; G01N 21/9501; G01N 21/9506
See application file for complete search history.

(56) References Cited

U.S. PATENT DOCUMENTS

| | | | |
|---|---|---|---|
| 7,061,595 | B2 | 6/2006 | Cabuz et al. |
| 7,061,598 | B1 | 6/2006 | Bevis et al. |
| 2006/0060189 | A1 | 3/2006 | Liu et al. |
| 2009/0213364 | A1* | 8/2009 | Matsui ............... G01N 21/8806 356/237.3 |
| 2016/0139059 | A1 | 5/2016 | Matsumoto et al. |
| 2017/0219496 | A1* | 8/2017 | Durand De Gevigney ................. G01M 11/331 |

FOREIGN PATENT DOCUMENTS

| | | |
|---|---|---|
| JP | 2018-189517 | 7/2020 |
| WO | 2009/112704 A1 | 9/2009 |

OTHER PUBLICATIONS

International Written Opinion for International Application No. PCT/FR2019/052210 dated Jan. 24, 2020, 15 pages.
Chinese First Office Action for Application No. 201980066101.X dated Jan. 19, 2024, 9 pages.

* cited by examiner

DARK-FIELD OPTICAL INSPECTION DEVICE

CROSS-REFERENCE TO RELATED APPLICATIONS

This application is a national phase entry under 35 U.S.C. § 371 of International Patent Application PCT/FR2019/052210, filed Sep. 20, 2019, designating the United States of America and published as International Patent Publication WO 2020/074800 A1 on Apr. 16, 2020, which claims the benefit under Article 8 of the Patent Cooperation Treaty to French Patent Application Serial No. 1859311, filed Oct. 8, 2018.

TECHNICAL FIELD

The present disclosure relates to a device for dark-field optical inspection of a substrate in order to detect therein the possible presence of a defect or of a particle, or more generally to characterize the surface condition thereof. The substrate can be a wafer for manufacturing components in the field of electronics, optics, or optoelectronics.

BACKGROUND

Substrates, such as wafers, for electronics, optics or optoelectronics must be inspected in order to be able to detect, identify, and/or characterize any defects and/or particles present on the surfaces or in the volumes thereof. Defects can be crystal defects, scratches, asperities, or surface roughness.

This inspection is generally aimed at providing qualitative or quantitative information such as the location, size, and/or nature of the defect or particle, for example. This information about the surface condition of the substrate can be representative of the quality of the substrate manufacturing process or of a production step in which the substrate is used.

It is known that the light scattered by the surface of a substrate during dark-field illumination is spatially distributed according to specific azimuthal angles and/or elevations that constitute a signature that contains information regarding the presence and/or the nature of a defect or a particle.

For instance, an inspection device comprising the dark-field illumination of a substrate using an incident light beam that is projected onto an inspection point of the substrate is known from document U.S. Pat. No. 6,538,730. A mirror that collects diffuse light radiation has a symmetry of revolution with respect to an axis that passes through the inspection point and is perpendicular to the substrate. A portion of the diffuse light radiation reflected from the substrate is collected in order to be directed toward a focal point. Collector devices, such as the fibers of an optical fiber bundle or the pixels of an array, are arranged around the axis of symmetry in order to collect the diffuse radiation according to a specific azimuthal angle distribution. Since the angle discrimination is performed at a plurality of fibers or pixels, these must be placed at a certain distance from the focal point in order to collect the radiation at a light spot rather than at a point. The light spot is spatially resolved by the fiber bundle or pixel array.

Therefore, this approach discriminates the diffuse radiation according to the azimuthal angle over a wide spatial area, which necessarily leads to a photometric loss corresponding to the portion of the radiation that is not collected by the fibers or the pixels.

The azimuthal angle distribution information is therefore obtained at the cost of a loss of signal, which can lead to imposing a relatively long acquisition time and hence to a relatively low inspection rate.

What is more, the spatial resolving of this light spot brings an increased risk of crosstalk at the transitions between the zones to be distinguished.

The present disclosure proposes a solution to this problem. It aims, in particular, to establish, in a dark-field optical inspection device, information on the azimuthal angles of the diffuse radiation at an improved measurement rate compared to the solutions of the prior art.

BRIEF SUMMARY

With a view to achieving one of these aims, it is the object of the present disclosure to propose a device for dark-field optical inspection of a substrate such as a wafer for electronics, optics, or electronics, which comprises:
  a light source for generating at least one incident illuminating beam that is projected onto an inspection zone of the substrate and is capable of being reflected therein in the form of diffuse radiation;
  at least one first and one second collector device having a sensing surface for capturing at least a portion of the diffuse radiation and transmitting it to an analysis device;
  a reflecting optical device having a reflective surface that is designed to direct at least a portion of the diffuse radiation originating from an optical focal point of collection that is coincident with the inspection zone in the direction of the collecting devices.

The optical inspection device is remarkable in that:
  the reflective surface of the reflecting optical device comprises a first reflective zone onto which a first portion of the diffuse radiation is reflected toward a first optical focal point of detection, which is optically conjugate with the optical focal point of collection, and a second reflective zone onto which a second portion of the diffuse radiation is reflected toward a second optical focal point of detection, which is optically conjugate with the optical focal point of collection and distinct from the first optical focal point of detection;
  the first and the second collecting device are, respectively, arranged in the inspection device in order to capture the diffuse radiation at the first and the second optical focal point of detection of the reflecting optical device.

In this way, different portions of the spatially discriminated diffuse radiation can be collected very efficiently at the reflecting optical device. Each portion of this radiation is then entirely or almost entirely collected by one of the collecting devices.

According to other advantageous and non-limiting characteristics of the present disclosure, taken alone or in any technically feasible combination:
  the light source is designed to generate at least one illuminating beam that is incident on the substrate at an oblique angle of incidence relative to the plane of the substrate;
  the light source is designed to generate at least two illuminating beams that are incident on the substrate on a plane of incidence at an oblique angle of incidence relative to the plane of the substrate, the illuminating beams forming between them a non-zero angle on the plane of incidence and being mutually coherent so as to generate interference in the inspection zone;

the first reflective zone is delimited angularly by the azimuth, so that the first portion of the diffuse radiation that it intercepts corresponds to a backscatter;

the second reflective zone is delimited angularly by the azimuth, so that the second portion of the diffuse radiation that it intercepts corresponds to a forward scatter;

the first and second reflective zones are complementary, so that at least a portion of the diffuse radiation is collected by the reflecting optical device for all possible azimuth angles;

the first and the second reflective zone correspond to portions of distinct ellipses whose respective main axes form a non-zero angle between them, a first focal point of the ellipses corresponding to the optical focal point of collection, and the other focal point of the ellipses corresponding, respectively, to the first and to the second optical focal point of detection of the reflecting optical device;

at least one among the first and second collector device comprises an optical fiber, one end of which forms the sensing surface of the collector device, the end of the optical fiber being disposed in the inspection device so as to coincide, or to be optically conjugated, with the first and/or the second optical focal point of detection;

at least one among the first and the second collecting device comprises an optical focusing element such as a lens or a microlens;

the optical axis of the optical fiber is aligned with the bisector of the solid angle of incidence of the light radiation at the optical focal point of detection;

the first optical focal point of detection and the second optical focal point of detection are, respectively, at a first and a second distance from an axis perpendicular to the substrate passing through the inspection zone, the first distance being different from the second;

the first reflective zone and the second reflective zone are designed to each reflect portions of the diffuse radiation corresponding to different elevation angle sectors;

the inspection device comprises a third collecting device for capturing at least a portion of the diffuse radiation at a solid angle around a normal to the surface of the substrate passing through the inspection zone.

The present disclosure also relates to a reflecting optical device for reflecting diffuse light radiation from a dark-field optical inspection device, the reflecting optical device comprising a reflective surface that is configured according to a first reflective zone for orienting a first portion of the diffuse radiation originating from an optical focal point of collection toward a first optical focal point of detection, which is optically conjugate with the optical focal point of collection, and according to a second reflective zone in order to direct a second portion of the diffuse radiation originating from the optical focal point of collection toward a second optical focal point of detection, which is optically conjugated with the optical focal point of collection and distinct from the first optical focal point of detection.

Advantageously, the first reflective zone and the second reflective zone are produced with distinct mechanical elements.

BRIEF DESCRIPTION OF THE DRAWINGS

Other features and advantages of the present disclosure will become apparent from the detailed description of the present disclosure that follows with reference to the accompanying figures, in which.

DETAILED DESCRIPTION

Figure 1:
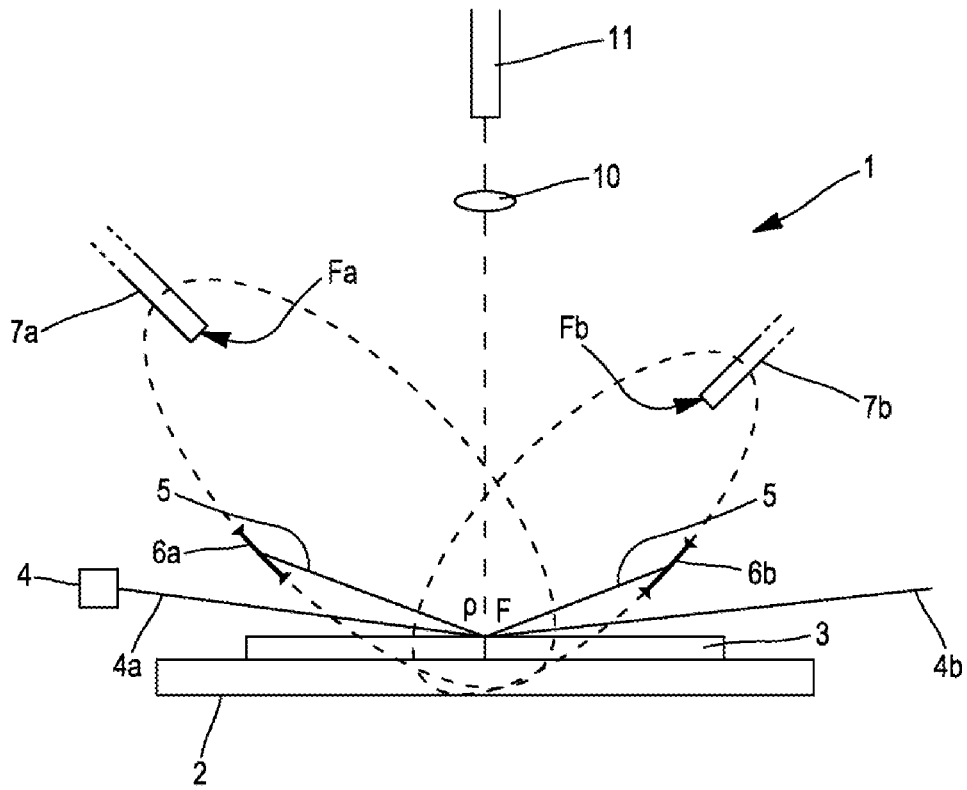
FIG. 1 is a schematic of a dark-field optical inspection device according to the detailed description.

FIG. 1 shows a schematic of a dark-field optical inspection device 1 according to the present description. A chamber defines an internal space that is isolated from the exterior light. The internal space comprises a support 2 for a substrate 3.

The substrate 3 can, for example, be or comprise a wafer made of a semiconductor material such as silicon or germanium, or an insulating material such as glass, or it can even be composed of a plurality of layers, and it can be bare or provided with electronic or optical circuits described above, for example. The substrate 3 can, for example, also comprise any type of substrate that is known in the semiconductor industry, MEMS, or integrated optics, such as "wafers on frame," "dicing frames," or "panels," for example.

The support 2 can be set in motion or caused to rotate or move translationally, for example, in a direction that is included in the plane defined by the support so as to enable the entire exposed surface of the substrate 3 to be inspected with one or more illuminating beams 4a, as will be explained later. To this end, the optical inspection device is provided with a mechanism for moving the support 2 in a controlled manner relative to the illuminating beam 4a, not shown in FIG. 1. The displacement mechanism may, for example, comprise a device for rotating the support 2 along an axis perpendicular to its plane, as well as a device for translating the support 2 and/or the illuminating beam 4a on the plane of the support 2. It is thus possible to inspect the entire surface of the substrate 3 with the illuminating beam(s) 4a in a spiral path.

The displacement mechanism can also make it possible to move the support 2 translationally relative to the optical device in a direction perpendicular to the plane defined by the support 2 so as to enable the illuminating beam(s) 4a to be optimally positioned on the substrate 3, particularly for the inspection of substrates of various or variable thicknesses.

The optical inspection device 1 also comprises a light source 4, e.g., a laser source. The source is arranged in the device for the purpose of projecting an incident illuminating beam 4a onto a zone or an inspection point P of the surface of the substrate 3. The light source 4 can comprise or be associated with optical components, lenses, or mirrors, for example, in order to direct the incident illuminating beam 4a onto the inspection point P. These optical components have been omitted from FIG. 1 for the sake of simplicity.

Here, the illuminating beam 4a has an oblique incidence with respect to the plane defined by the support 2. This oblique incidence may, for example, have an angle of between 40 and 60 degrees relative to the plane defined by the support 2. When a substrate is placed on the support 2, the incident beam 4a is reflected onto the inspection point P in a specular reflection 4b and—optionally, and depending on the surface condition of the substrate 3 at the inspection point P—as scattered or diffuse radiation 5. This diffuse radiation 5 is emitted in angular directions, in azimuth and in elevation, which depend on the properties of the surface of the substrate 3. This angular distribution of the diffuse radiation 5 according to the azimuth and/or elevation angles can thus be interpreted in order to determine the surface condition of the substrate at the inspection point P.

Figure 2A:
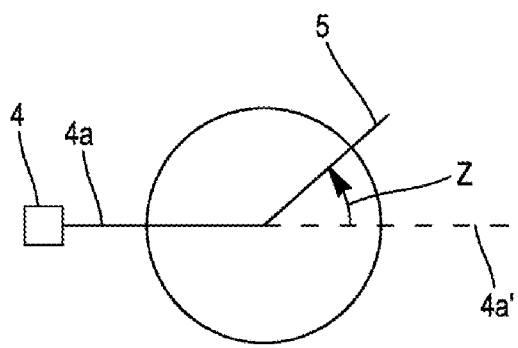
FIGS. 2A and 2B define the azimuth and elevation angles.
Figure 2B:
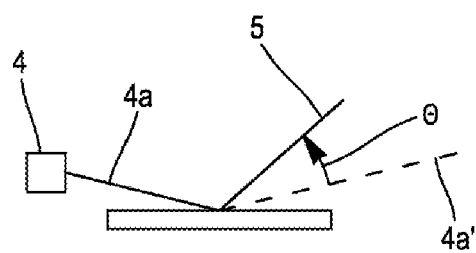

In order to dispel with any ambiguity, and with reference to FIGS. 2A and 2B, the azimuth angle Z of a direction of diffusion is defined here as the angle projected onto the plane defined by the support 2 between a reference direction, which can be as illustrated the direction of the incident beam 4a or of its specular reflection 4b, and the direction of diffusion being considered. Furthermore, the elevation angle θ of a direction of diffusion is defined as the angle formed between the plane defined by the support 2 and this direction of diffusion. By convention, the azimuth angle of the diffusion is zero when the direction of diffusion corresponds to the direction of propagation of the incident beam 4a or of its specular reflection 4b at the inspection point P as projected onto the plane of the support 2. Likewise, the angle of elevation of the diffusion is zero when the direction of diffusion is parallel to the plane of the support 2.

Returning to the description of FIG. 1, the optical inspection device 1 also comprises a reflecting optical device 6 for directing at least a portion of the diffuse radiation 5 in the direction of collecting devices 7a, 7b. This reflecting optical device 6 may be composed of one or more optical parts, such as mirrors, that are arranged in the vicinity of the inspection point P, for example, around the inspection point P. The reflecting optical device 6 has a reflective surface facing toward the inspection point P, so as to enable the diffuse radiation 5 to be intercepted according to angular sectors determined in azimuth and in elevation, and so as to enable it to be redirected toward the collecting devices 7a, 7b.

More specifically, the reflecting optical device 6 has an optical focal point of collection F that is positioned so as to be coincident with the inspection point P. In other words, the reflecting optical device 6 is arranged in the optical inspection device 1 during the measurement and relative to the other elements of this device in order to render the optical focal point of collection F coincident with the zone or the inspection point P. A provision can be made to move the support 2 translationally in a direction perpendicular to the plane that it defines so as to obtain this measurement configuration with precision.

The reflective surface of the reflecting optical device 6 comprises at least one first reflective zone 6a onto which a first portion of the diffuse radiation 5 is reflected. This first portion of the diffuse radiation may be that intercepting a first solid angle whose origin is placed on the inspection point P and defined by a first azimuth and elevation angle range. The first reflective zone 6a of the reflective surface is configured to reflect the first portion of the diffuse radiation originating from the optical focal point of collection F toward a first optical focal point of detection Fa, which is optically conjugate with the optical focal point of collection F. In this way, the first portion of the diffuse radiation 5 originating from the inspection point and intercepted by the first reflective zone 6a is reflected so as to converge toward the first detection focal point Fa. The expression "toward a first optical focal point" is intended to mean "directly toward a first optical focal point"—that is, without the intermediary of another reflective surface and/or of an optically conjugated intermediate optical focal point of the optical focal point of detection Fa and of the optical focal point of collection F.

It will be recalled that an optical focal point is a point toward which the light rays originating from a point converge after passing through an optical system. In the present disclosure, the optical focal point of collection F and the first optical focal point of detection Fa are furthermore optically conjugated with one another insofar as the light rays originating from one and reflected by the first reflective zone 6a converge toward the other.

Similarly, the reflective surface of the reflecting optical device 6 comprises a second reflective zone 6b onto which a second portion of the diffuse radiation 5 is reflected. This second portion of the diffuse radiation can be that intercepting a second solid angle whose origin is placed on the inspection point P and defined by a second azimuth and elevation angle range, is distinct, and does not cover the first azimuth and elevation angle range. The second reflective zone 6b of the reflective surface is configured to reflect the second portion of the diffuse radiation 5 originating from the optical focal point of collection F toward a second optical focal point of detection Fb, which is optically conjugate with the optical focal point of collection F. Thus, the second portion of the diffuse radiation 5 originating from the inspection point P and intercepted by the second reflective zone 6b is reflected so as to converge toward the second optical focal point of detection Fb. The expression "toward a second optical focal point" is intended to mean "directly toward a second optical focal point"—that is, without the intermediary of another reflective surface and/or of an optically conjugated intermediate optical focal point of the optical focal point of detection Fb and of the optical focal point of collection F.

In the optical inspection device according to the present description, the second optical focal point of detection Fb is distinct from the first optical focal point of detection Fa.

There are many ways to configure the reflecting device so that it has optical focal points of detection Fa, Fb that are distinct and conjugate with the optical focal point of collection F. By way of example, and as shown schematically in FIG. 4A and FIG. 4B, the first and the second reflective zones 6a, 6b can have a profile corresponding, respectively, to portions of ellipses (called "generating ellipses") whose main axes (joining the foci of the ellipse) form a non-zero angle between them. A focal point of the generating ellipse of the first reflective zone 6a and a focal point of the generating ellipse of the second reflective zone 6b are brought into coincidence to form the optical focal point of collection F, and the other focal point of each ellipse corresponds, respectively, to the first and to the second optical focal point of detection Fa, Fb.

Figure 4A:
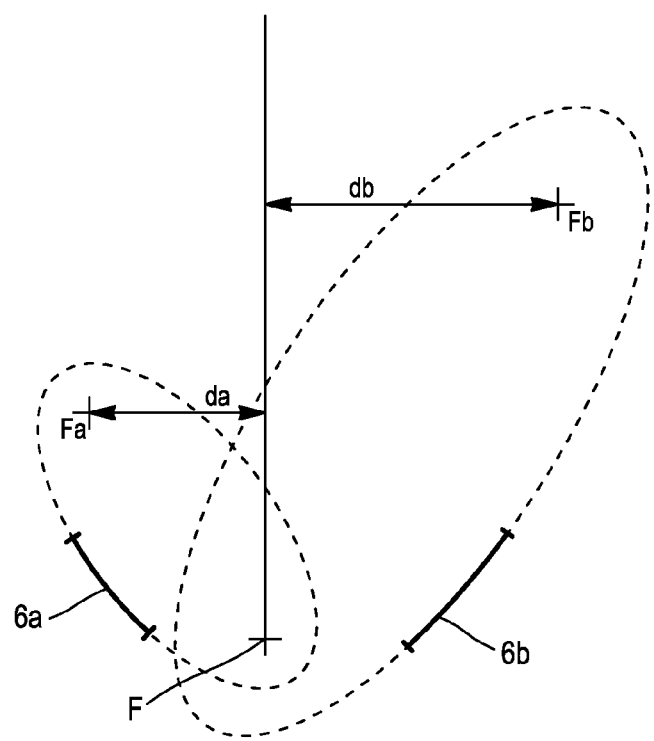
FIGS. 4A and 4B show particular configurations of a reflecting optical device.
Figure 4B:
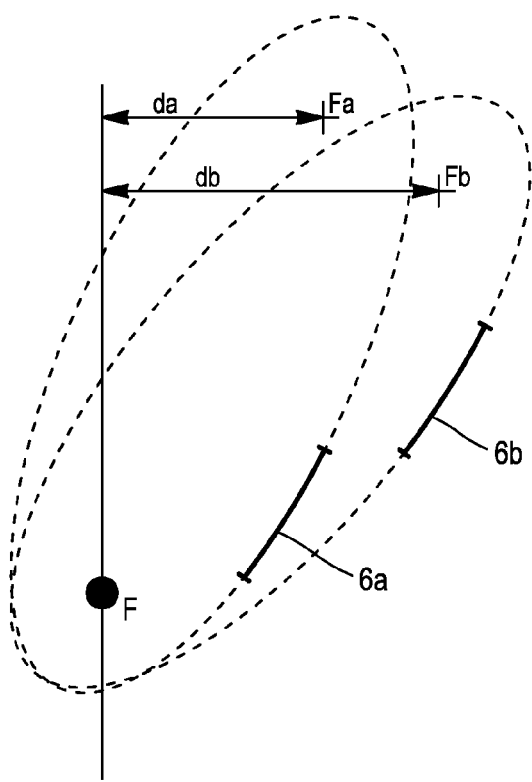

In an optical inspection device 1 according to the present description, it is not necessary for the first and the second optical focal point of detection Fa, Fb to be arranged so as to be at the same distance from an axis perpendicular to the support 2 and pass through the inspection point or zone P. As can be seen in FIG. 4A and FIG. 4B, the first and second distances da, db, respectively, separating the first optical focal point Fa and the second optical focal point Fb from this axis may be different. This feature provides a great deal of flexibility for arrangement of the various optical elements and components forming the optical inspection device 1 in the chamber.

As will be readily understood, it is possible to envisage other configurations according to which the reflective surface of the reflecting optical device 6 has other reflective zones that intercept other portions of the diffuse radiation 5 and overlap neither with one another nor with the first portion and the second portion of the diffuse radiation 5 in order to cause them to converge toward other optical focal points of detection at which other collecting devices are positioned. Each other optical focal point of detection is optically conjugate with the optical focal point of collection F that is coincident with the inspection point P.

According to a first particular configuration, which is illustrated in FIG. 4A, the first and the second reflective zones 6a, 6b are configured to each reflect portions of diffuse radiation 5 corresponding to different azimuth angle sectors, meaning that they do not overlap. The elevation angle sectors can then be identical, overlap, or be different.

According to another particular configuration, which is illustrated in FIG. 4b, the first and the second reflective zones 6a, 6b are configured to, respectively, reflect portions of diffuse radiation 5 corresponding to different elevation angle sectors, meaning that they do not overlap. The azimuth angle sectors can then be identical, overlap, or be different.

According to another particular configuration, the configurations illustrated in FIG. 4A and in FIG. 4B can be combined to result in a system with four reflective zones that return portions of diffuse radiation 5 toward four distinct optical focal points of detection that are optically conjugate with the optical focal point of collection F. As an example, these four reflective zones can be arranged so as to intercept the diffuse radiation 5 according to two distinct elevation angle sectors, these two distinct angular sectors being crossed with an azimuth angle range between −90 degrees and 90 degrees, and with an azimuth angle range between 90 degrees and 270 degrees.

Regardless of the number of zones of the reflective surface and the particular configurations thereof, the diffuse radiation 5 is at least partly reflected so as to converge at a first optical focal point of detection Fa and a second optical focal point of detection Fb. And the optical inspection device 1 comprises at least one first and one second collecting device 7a, 7b for the reflected diffuse radiation. These collecting devices 7a, 7b each have a capture surface, the light radiation received at this surface being able to be picked up in order to be guided and transmitted, for example, to an analysis device of the optical inspection device 1 or associated with the optical inspection device 1. This analysis device can make it possible, for example, to measure the intensity, the spectral content, and the polarization of the radiation that is captured and to derive therefrom all the necessary analysis quantities. The analysis device may be any suitable device such as a computing device, a spectrometer, or the like.

The first and the second collecting devices 7a, 7b are, respectively, arranged in the optical inspection device 1 in order to capture the scattered radiation at the first and at the second optical focal point of detection Fa, Fb.

To this end, the capture surfaces can be arranged in the device so as to be precisely placed at the first optical focal point of detection Fa and at the second optical focal point of detection Fb, respectively, or in the immediate vicinity of these focal points.

The capture surfaces can also be positioned so as to be optically conjugated with the optical focal points of detection Fa, Fb by means of optical focusing elements, such as lenses.

Each collecting device 7a, 7b can comprise an optical fiber or a bundle of optical fibers, the end section of which forms the capture surface. In this case, it is therefore the end of the optical fiber or of the bundle that is positioned in the optical inspection device 1 in order to be maximally coincident with an optical focal point of detection Fa, Fb.

In order to improve coupling, at least one of the collecting devices 7a, 7b may include an optical focusing element such as a lens, a GRIN index gradient lens, or a micro lens that is positioned so as to optically conjugate the end of the optical fiber(s) and the optical focal point of detection.

In addition, in order to promote the capture of the reflected diffuse radiation, it is advantageous to position the optical fiber or the optical fiber bundle such that its axis is aligned or substantially aligned with the bisector of the solid angle of incidence, at the optical focal point for detection of the reflected diffuse radiation.

Optical fibers have the advantage of allowing the production of collecting devices 7a, 7b of very small size, because the detector (a photodiode or an avalanche photodiode, for example) can be deported remotely at another end of the optical fibers.

As will be readily understood, the collecting devices 7a, 7b can be produced by any other means. For instance, it is possible to position photodetectors (such as photodiodes or avalanche photodiodes, for example) at the optical focal points of detection Fa, Fb or at optically conjugated points of the optical focal points of detection Fa, Fb by means of optical focusing elements.

The optical inspection device 1 that has just been described is advantageous in that it makes it possible to collect, for analysis, different portions of the diffuse radiation that is spatially discriminated at the level of the reflecting optical device 6. Each portion of this radiation is then collected in its entirety, or almost in its entirety, by one of the collecting devices 7a, 7b. This results in a device having a very high level of photometric efficiency. The time of a measurement—i.e., the time required for the collection of a sufficient quantity of photons—may be shorter than in devices of the prior art, making the inspection rate faster.

It may also be useful to measure a portion of the diffuse radiation 5 scattered by the substrate 3 at the level of the inspection point P in directions that are essentially normal to this substrate 3 and, more precisely, are included in a solid angle around the normal and generated by a cone whose origin is the inspection point P. To enable this analysis, which also provides information on the surface condition of the substrate at the inspection point P, the device of the present disclosure can further comprise a third collecting device 11 for capturing this so-called "normal" diffusion. This third collecting device 11 can be produced in the same manner as the collecting devices 7a, 7b. In particular, it may comprise a photodetector or an optical fiber, or a bundle of optical fibers that are arranged along the normal to capture this portion of the diffuse radiation 5, for example.

In this configuration, the solid capture angle is defined by the capture surface of the third collecting device 11 (of the optical fiber or direct photodetector type, for example). In order to adjust, and particularly increase, this solid capture angle, the device may also comprise an optical focusing element 10, such as a lens, to collect this diffuse radiation over a larger solid angle and focus it toward the third collecting device 11.

In order to analyze the surface condition of the substrate at the inspection point P, it is often useful to have a measurement of the backscatter, or of the forward scatter, or simultaneously of the forward scatter and the backscatter of the illuminating beam 4a.

The backscatter corresponds to the diffuse radiation 5 having an azimuth angle of between 90 and 270 degrees, i.e., generally propagating in the direction opposite the direction of propagation of the incident beam 4a when the latter is in oblique incidence.

The forward scatter corresponds to the diffuse radiation 5 having an azimuth angle of between −90 and 90 degrees, i.e., generally propagating in the direction of the incident beam 4a when the latter is in oblique incidence.

In order to establish the back scatter measurement, the optical inspection device 1 can be configured such that the first reflective zone 6a of the reflective surface is delimited in azimuth so that the first portion of the diffuse radiation 5 that it intercepts corresponds to a backscatter. In other words, the first reflective zone 6a of the reflective surface is arranged around the inspection point P in an azimuth angle range between 90 and 270 degrees, which can be distributed symmetrically or non-symmetrically relative to the direction of the incident beam 4a. If the azimuthal extension of this first reflective zone 6a covers the azimuth angle of the incident beam 4a (180 degrees, by convention), it is of course limited in elevation or provided with an opening in order to allow this incident beam 4a to pass.

Likewise, in order to establish this measurement of forward scatter, the optical inspection device 1 can be configured such that the second reflective zone 6b of the reflective surface is delimited in azimuth so that the second portion of the diffuse radiation 5 that it intercepts corresponds to a forward scatter. This second reflective zone 6b can be arranged around the inspection point P in an azimuth angle range between −90 and 90 degrees, which can be distributed symmetrically or non-symmetrically relative to the direction of the specular reflection 4b. If the azimuthal extension of this second reflective zone 6b covers the azimuth angle of the specular reflection 4b (0 degrees, by convention), it is of course limited in elevation or provided with an opening so as not to capture this specular reflection 4b.

This configuration is the one illustrated in FIG. 4A, for example.

As will be readily understood, other types of angular distribution according to the azimuth of the reflective zones can be provided, for example, with reflective zones that are designed to capture a forward scatter portion and a backscatter portion in azimuth angle ranges between 0 and +/−180 degrees, inclusive.

Likewise, the different reflective zones can have an identical or different angular positioning in elevation according to all the possible combinations.

On the other hand, the reflective surfaces and the collecting devices are generally and preferably positioned so as not to capture the specular reflection component 4b of the incident beam 4a.

The selection of the angular positioning of the reflective zones can be made as a function of the desired measurement characteristics based, for example, on well-known theories of diffusion such as that known as "Mie scattering."

For example, it is possible to define a rear reflective zone 6a that collects only the portion corresponding to the backscatter of the signal according to azimuth angles of between 90 degrees and 270 degrees, and a front reflective zone 6b that collects only the portion corresponding to the forward scatter of the signal at azimuth angles between −90 and 90 degrees. The particles that are likely to be present at the surface of the inspected substrate and be of greater size than the wavelength of the illuminating beam have a scattering lobe that is arranged primarily in the direction of propagation of this beam. It is easier to distinguish these particles on the basis of the forward scatter. Conversely, particles that are very small compared to the wavelength of the illuminating beam have a very isotropic scattering lobe, and it is more advantageous to detect them using the backscatter, which comprises substantially as much scattered light as the forward scatter but tends to be less polluted than the forward scatter due to the highly anisotropic roughness signals.

According to a particular embodiment, it is possible to make a provision that the reflective zones making up the reflective surface, including a first and a second reflective zone 6a and 6b, and possibly other reflective zones, are complementary to one another, so that, together, they capture at least a portion of the diffuse radiation 5 for all possible azimuth angles, or most of them, i.e., between 0 and 360 degrees. However, it should be noted that, even in this case, due to the existence of separate optical focal points of detection for each reflective zone, the overall surface resulting from the combination of the reflective zones is not a surface having a symmetry of revolution. In other words, this overall surface has an asymmetry of revolution, particularly with respect to an axis that passes through the focal point of detection and is normal to the surface of the substrate.

Figure 3A:
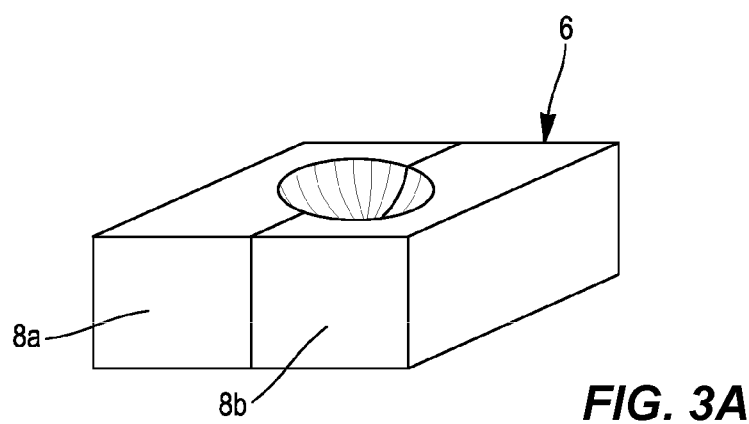
FIGS. 3A and 3B represent a particular example of a reflecting optical device.
Figure 3B:
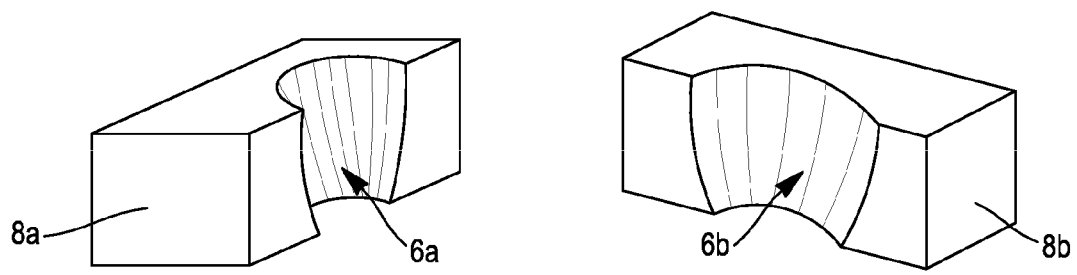

FIGS. 3A and 3B show a particular exemplary embodiment of the reflecting device. As is can be seen particularly in these figures, the reflecting device is composed here of two optical parts 8a, 8b that are mechanically distinct from one another and assembled together at the respective assembly surfaces. The optical parts 8a, 8b are formed here from blocks of material, for example, metal. A first recess has been produced on the optical part 8a, for example, by machining, which opens onto the assembly face. The recess extends from a first face of the block to an opposite face so as to define the first reflective zone 6a. A second recess defining the second reflective zone 6b has been similarly formed in the second block of optical part 8b.

The reflecting optical device 6 is obtained by assembling the two optical parts 8a, 8b by their assembly faces so as to form a central opening leading out on either side of the device.

A provision can be made to design the reflecting device by assembling more than two optical parts in a manner similar to what has just been presented in order to form an inspection device that makes it possible to capture more than two portions of diffuse radiation 5. It is also possible to envisage not assembling the two optical parts 8a, 8b together and placing them separately in the chamber in order to render the optical inspection device 1 functional.

The principles that have just been explained can find application in different types of optical inspection devices.

Figure 5A:
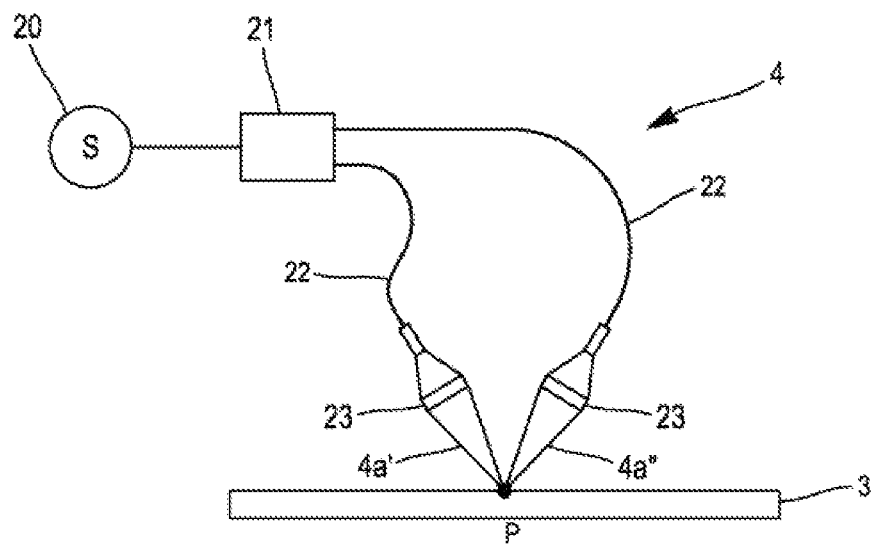
FIGS. 5A and 5B, respectively, show an embodiment of a light source with two beams, and a diffusion signal obtained with this source.
Figure 5B:
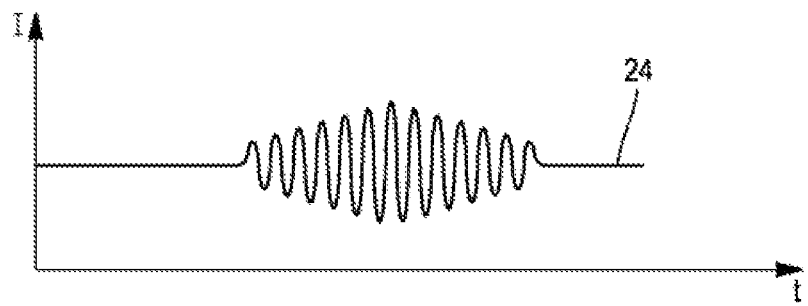

In particular, with reference to FIGS. 5A and 5B, the light source 4 can be provided to generate two coherent incident beams 4a', 4a" and direct them toward the surface of the substrate 3 according to an oblique plane of incidence relative to this substrate. The two incident beams 4a', 4a" can form a predetermined angle between them so as to form an interference zone at the level of the inspection point P. Such a device is known, for example, from document WO2009112704.

In this configuration, the light source 4 can, for example, comprise a laser source 20 such as a laser diode that emits in the blue or the ultraviolet. The light from the source is separated into two beams 4a', 4a", for example, by means of a fiber coupler 21, and directed by optical fibers 22 and focusing optics 23 such as lenses toward the inspection zone P.

When a particle or any other scattering source present on or in the substrate 3 passes through the area of overlap of the incident beams 4a', 4a" in the inspection zone P, the resulting diffuse radiation 5 as captured by the collecting devices described above takes the temporal form of an interference "puff" or of an interferogram 24, the frequency of which depends on the running speed.

As is explained in WO2009112704, a signal is thus obtained that enables better spatial localization of the scattering sources to be achieved, since it is limited to the volume of the interference zone. This signal also presents richer information on the properties of the scattering sources and allows for optimal detection in terms of sensitivity.

The light source 4 as illustrated in FIG. 5A can be integrated into all of the embodiments described above. It is simply necessary to take into account the fact that there are two specular reflections that are very close angularly. The beams 4a', 4a" are included in a plane of incidence having an oblique angle of incidence (in elevation) with respect to the plane defined by the support 2. This angle of incidence is defined in the same way as the angle of incidence of the single illuminating beam 4a of the embodiment of FIG. 1.

As will be readily understood, the present disclosure is not limited to the embodiment described, and it is possible to provide variant embodiments without departing from the scope of the invention as defined by the claims.

The invention claimed is:

1. A device for dark-field optical inspection of a substrate, such as a wafer for electronics, optics, or electronics, the device comprising:
a light source for generating at least one incident illuminating beam that is projected onto an inspection zone of the substrate and is capable of being reflected therein in the form of diffuse radiation;
at least one first and one second collecting device having a sensing surface for capturing at least a portion of the diffuse radiation and transmitting it to an analysis device, the analysis device configured to measure at least one of an intensity, a spectral content, and a polarization of the diffuse radiation that is captured and to derive therefrom analysis quantities; and
a reflecting optical device comprising a first reflecting optical part and second reflecting optical part, the reflecting optical device having a reflective surface that is designed to direct at least a portion of the diffuse radiation originating from an optical focal point of collection that is coincident with the inspection zone in the direction of the collecting devices;
wherein the reflective surface of the reflecting optical device comprises a first reflective zone made on the first optical part and onto which a first portion of the diffuse radiation is reflected toward a first optical focal point of detection that is optically conjugated with the optical focal point of collection, and a second reflective zone made on the second reflecting optical part and onto which a second portion of the diffuse radiation is reflected toward a second optical focal point of detection that is optically conjugated with the optical focal point of collection and distinct from the first optical focal point of detection;
wherein the first and the second collecting device are, respectively, arranged in the inspection device in order to capture the diffuse radiation at the first and the second optical focal point of detection of the reflecting optical device; and
wherein the first and the second reflective zones correspond to portions of distinct ellipses whose respective main axes form a non-zero angle between them, a first focal point of the ellipses corresponding to the optical focal point of collection, and a second focal point of the ellipses corresponding, respectively, to the first optical focal point of detection and to the second optical focal point of detection of the reflecting optical device.

2. The inspection device of claim 1, wherein the light source is configured to generate at least one incident illuminating beam on the substrate at an oblique angle of incidence relative to the plane of the substrate.

3. The inspection device of claim 2, wherein the light source is configured to generate at least two illuminating beams that are incident on the substrate on a plane of incidence at an oblique angle of incidence relative to the plane of the substrate, the illuminating beams forming between them a non-zero angle on the plane of incidence and being mutually coherent so as to generate interference in the inspection zone.

4. The inspection device of claim 3, wherein the first reflective zone is delimited angularly by the azimuth, so that the first portion of the diffuse radiation that it intercepts corresponds to a backscatter.

5. The inspection device of claim 4, wherein the second reflective zone is delimited angularly by the azimuth, so that the second portion of the diffuse radiation that it intercepts corresponds to a forward scatter.

6. The inspection device of claim 5, wherein the first and second reflective zones are complementary, so that at least a portion of the diffuse radiation is collected by the reflecting optical device for all possible azimuth angles.

7. The inspection device of claim 1, wherein at least one among the first and the second collecting device comprises an optical fiber, one end of which forms the sensing surface of the collecting device, the end of the optical fiber being disposed in the inspection device so as to coincide, or to be optically conjugated, with the first and/or the second optical focal point of detection.

8. The inspection device of claim 7, wherein the optical axis of the optical fiber is aligned with the bisector of the solid angle of incidence of the light radiation at the optical focal point of detection.

9. The inspection device of claim 1, wherein at least one of the first and the second collecting device comprises an optical focusing element.

10. The inspection device of claim 1, wherein the first optical focal point of detection and the second optical focal point of detection are, respectively, at a first and at a second distance from an axis perpendicular to the substrate passing through the inspection zone, the first distance being different from the second.

11. The inspection device of claim 1, wherein the first reflective zone and the second reflective zone are designed to each reflect portions of the diffuse radiation corresponding to different elevation angle sectors.

12. The inspection device of claim 1, further comprising a third collecting device for capturing at least a portion of the diffuse radiation at a solid angle around a normal to the surface of the substrate passing through the inspection zone.

13. A reflecting optical device for reflecting diffuse light radiation from a dark-field optical inspection device, the reflecting optical device comprising a first reflecting optical part and second reflecting optical part, the reflecting optical device comprising a reflective surface configured according to a first reflective zone made on the first optical part to direct a first portion of the diffuse radiation originating from an optical focal point of collection toward a first optical focal point of detection that is optically conjugated with the optical focal point of collection, and according to a second reflective zone made on the second optical part to direct a second portion of the diffuse radiation originating from the optical focal point of collection toward a second optical focal point of detection that is optically conjugated with the optical focal point of collection and distinct from the first optical focal point of detection wherein the first and the second reflective zones correspond to portions of distinct ellipses whose respective main axes form a non-zero angle between them, a first focal point of the ellipses corresponding to the optical focal point of collection, and a second focal point of the ellipses corresponding, respectively, to the first optical focal point of detection and to the second optical focal point of detection of the reflecting optical device.

14. The reflecting optical device of claim 13, wherein the first reflective zone and the second reflective zone are produced with distinct mechanical elements.

15. The inspection device of claim 1, wherein the light source is configured to generate at least two illuminating beams that are incident on the substrate on a plane of incidence at an oblique angle of incidence relative to the plane of the substrate, the illuminating beams forming between them a non-zero angle on the plane of incidence and being mutually coherent so as to generate interference in the inspection zone.

16. The inspection device of claim 2, wherein the first reflective zone is delimited angularly by the azimuth, so that the first portion of the diffuse radiation that it intercepts corresponds to a backscatter.

17. The inspection device of claim 2, wherein the second reflective zone is delimited angularly by the azimuth, so that the second portion of the diffuse radiation that it intercepts corresponds to a forward scatter.

18. The inspection device of claim 1, wherein the first and second reflective zones are complementary, so that at least a portion of the diffuse radiation is collected by the reflecting optical device for all possible azimuth angles.

\* \* \* \* \*